(12) United States Patent
Chintala et al.

(10) Patent No.: US 7,133,222 B2
(45) Date of Patent: Nov. 7, 2006

(54) DEVICES AND METHODS FOR RETAINING A LENS IN A MOBILE ELECTRONIC DEVICE

(75) Inventors: Thomas J. Chintala, San Diego, CA (US); Scott R. Semenik, Saint Charles, IL (US)

(73) Assignee: Qualcomm, Inc., San Diego, CA (US)

( * ) Notice: Subject to any disclaimer, the term of this patent is extended or adjusted under 35 U.S.C. 154(b) by 87 days.

(21) Appl. No.: 10/963,962

(22) Filed: Oct. 12, 2004

(65) Prior Publication Data

US 2006/0077571 A1    Apr. 13, 2006

(51) Int. Cl.
*G02B 7/02* (2006.01)

(52) U.S. Cl. .................. 359/811; 359/817; 359/819; 396/144; 396/429

(58) Field of Classification Search ................ 359/811, 359/817, 819, 822, 827, 812, 813; 396/144, 396/429
See application file for complete search history.

(56) References Cited

U.S. PATENT DOCUMENTS

2002/0131782 A1 *  9/2002  Yamaguchi et al. ........ 396/429

* cited by examiner

*Primary Examiner*—Timothy Thompson
(74) *Attorney, Agent, or Firm*—Philip R. Wadsworth; Sandip (Micky) S. Minhas; Abdollah Katbab

(57) ABSTRACT

The described embodiments provide devices and methods for securing a lens member in a mobile electronic device. The lens member is positionable between a front housing and a rear housing of the device such that inner surfaces of the housings both exert a biasing force on the lens member such that the lens member is substantially immovable relative to the inner surfaces. As such, the lens member is securely fixed within the housings and cannot be removed or separated from one or both housings without evidence of tampering.

34 Claims, 5 Drawing Sheets

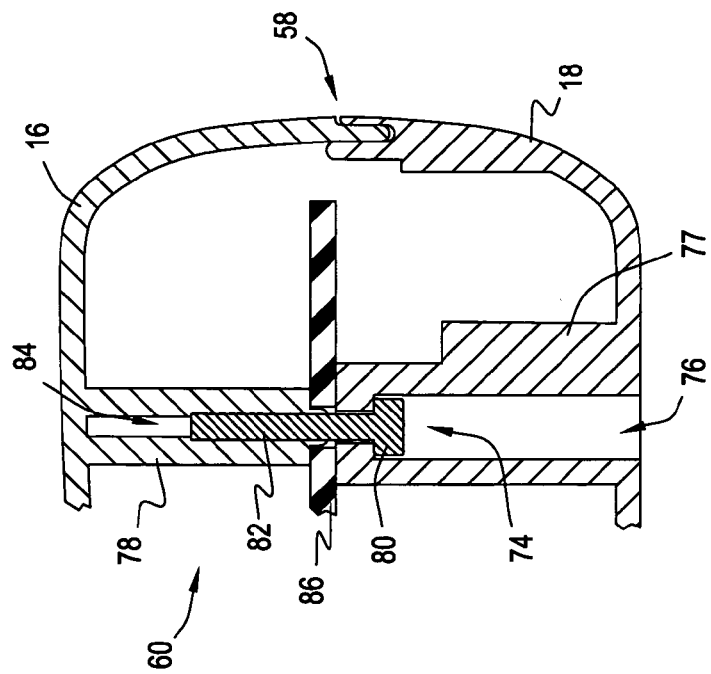
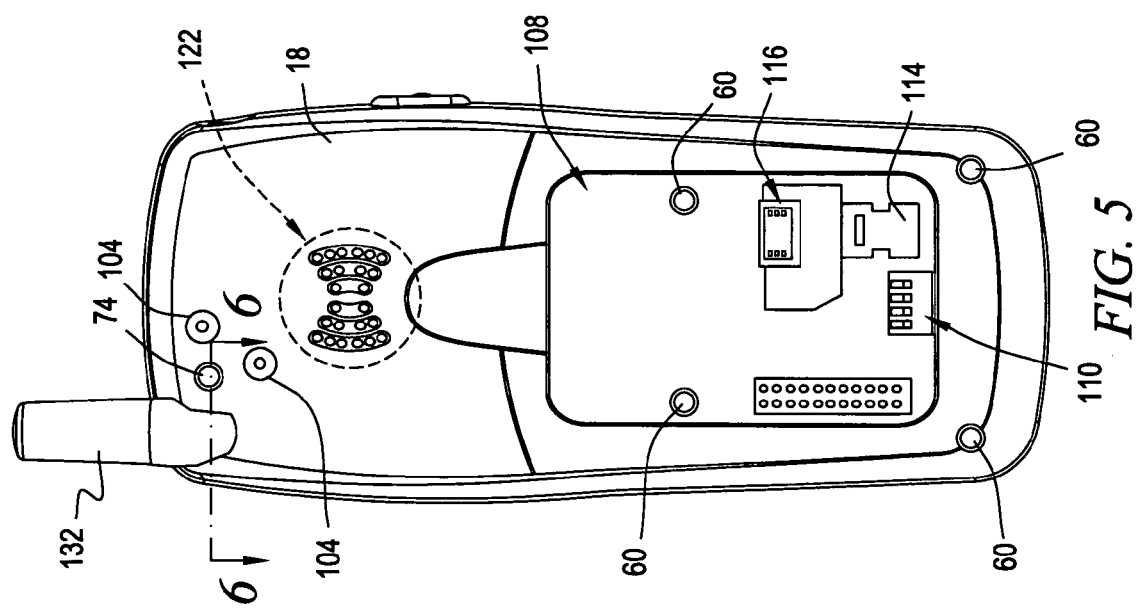
FIG. 6
FIG. 5

DEVICES AND METHODS FOR RETAINING A LENS IN A MOBILE ELECTRONIC DEVICE

STATEMENT REGARDING FEDERALLY SPONSORED RESEARCH OR DEVELOPMENT

The described embodiments were made with government support under United States government contract MDA904-01-G-0620 awarded by the National Security Agency. The government may have certain rights in these described embodiments.

CROSS-REFERENCE TO RELATED APPLICATIONS

This invention is related to applicants' following U.S. Patent Applications, each hereby incorporated by reference: application Ser. No. 10/964,403, entitled "Devices And Methods For Retaining An Antenna," filed concurrently herewith; application Ser. No. 10/964,105 entitled "Devices And Methods For Creating An Electrical Connection," filed concurrently herewith; and application Ser. No. 10/964,405 entitled "Devices And Methods For Connecting Housings," filed concurrently herewith.

BACKGROUND

The described embodiments relate to mobile electronic devices, and in particular, to lens members associated with display units and their assembly methods.

Mobile electronic devices, such as mobile phones, pagers, handheld computers, laptop computers, etc., are becoming increasingly popular for both business and personal use. One reason for this popularity relates to the inherent portability of such devices. A user may have the device with them at all times by simply carrying the device in their pocket, bag or attached to a belt or pocket such as through a clip-on carrier. This portability, however, also requires these devices to be relatively rugged as they are often subjected to rough treatment, including dropping and scratching. Certain components of the device, such as the display unit, is very sensitive to such rugged treatment. An impact on the surface of a display unit may cause it to malfunction, or not to function at all. Similarly, a scratch on the surface of a display unit interferes with a user's ability to see what is being displayed. Being a key component relating to customer satisfaction, manufacturers try to avoid these non-desirable conditions by protecting the display unit. In order to protect the display unit, such mobile electronic devices typically employ a protective, transparent lens positioned between the surface of the display unit and the outside of the device.

Typically, a lens is one of the last components assembled onto a mobile electronic device. One reason for placing the lens in position late in the assembly process is to reduce handling, and hence the potential for nicking and scratching, of the lens during the assembly process. Another reason is that a lens may be made from different colors of transparent materials, or may include various printed designs or word/ names, each of which may be utilized to meet consumer desire or manufacturer branding needs. For these reasons, among others, a lens is typically secured to the outside surface of a mobile electronic device once the entire device is assembled together. For example, an adhesive, such as an acrylic glue, or a mechanical fastener, such as a screw, may be utilized to hold the lens in place.

The placement of the lens onto the exterior of the mobile device, however, presents a number of problems. In many cases there is only an adhesive that secures the lens to the exterior of the device. The strength of such adhesives may change depending on the temperature, thereby allowing the lens to shift relative to the display unit or to fall off. Similarly, mechanical fasteners may be sheared off with the impact of dropping the device, thereby allowing the lens to loosen or fall off. Further, in some applications, such as when a mobile electronic device is desired to be secure from tampering, such as with devices carrying a warranty or with devices used in confidential applications, the exterior mounted lens allows access to the interior of the device. Typical lens mounting techniques allow a person to tamper with the device through the lens without leaving any evidence of the tampering. For example, externally secured mechanical fasteners may be removed and re-installed, or an adhesive seal may be broken by elevating or lowering the temperature and then re-sealed by bringing the device back to a room temperature. As such, typical lenses and their associated assembly methods allow a lens to become loose, to fall off, or to be tampered with without providing evidence of the tampering.

Thus, a lens for protecting a display unit of a mobile electronic device is desired to be tamper-resistant and/or tamper-evident, and which does not rely on external fixation of the lens.

BRIEF SUMMARY

In accordance with one aspect, the described embodiments provide a device and method for retaining a lens in an electronic device, such as to deter tampering with the device through the lens.

In one embodiment, a mobile electronic device comprises a front housing having a first inner surface and a rear housing having a second inner surface. The device further includes a lens member having a width in an x-axis, a height in a y-axis and a thickness in a z-axis. The lens member is positionable between the front housing and the rear housing such that the first inner surface and the second inner surface both exert a z-axis force on the lens member such that the lens member is substantially immovable along the z-axis.

In another embodiment, a communications device comprises a front housing having a first inner surface, a first outer surface and at least one wall defining an opening between the first inner surface and the first outer surface. The device further includes a rear housing having a second inner surface. Further, an securing mechanism is connectable to both the front housing and the rear housing. The securing mechanism fixedly positions the front housing relative to the rear housing. Additionally, the device includes a lens member having a width in an x-axis, a height in a y-axis and a thickness in a z-axis. The lens member is positionable between the front housing, adjacent to the opening, and the rear housing such that the first inner surface and the second inner surface both exert a z-axis force on the lens member such that the lens member is substantially immovable along the z-axis. The device also includes a display module positionable between the rear housing and the lens member. The display module has a display area facing the lens member.

In yet another embodiment, a communications device comprises a front housing having a first inner surface and a first support structure associated with the first inner surface. The device further includes a rear housing having a second inner surface and a second support structure associated with the second inner surface. The device also includes a lens member mountable between the front housing and the rear housing against both the first support structure and the second support structure such that the lens member is substantially immovable in a direction between the front housing and the rear housing.

In yet another embodiment, a lens is associated with a display of a mobile electronic device having a front housing and a rear housing. The lens comprises a body having a width in an x-axis, a height in a y-axis and a thickness in a z-axis. The body further has a front surface and a rear surface, and is positionable adjacent the display and between a first inner surface of the front housing and a second inner surface of the rear housing such that the first inner surface and the second inner surface both exert a z-axis force on the body such that the body is substantially immovable along the z-axis.

In a further embodiment, a method of assembling a mobile electronic device comprises providing a front housing having a first inner surface and providing a rear housing having a second inner surface. The method includes positioning a lens member in between the front housing and the rear housing, where the lens member has a width in an x-axis, a height in a y-axis and a thickness in a z-axis. The method further includes connecting the front housing to the rear housing such that the first inner surface and the second inner surface both exert a z-axis force on the lens member such that the lens member is substantially immovable along the z-axis.

In still another embodiment, a method of assembling a communications device comprises providing a front housing having a first inner surface and providing a rear housing having a second inner surface. The method includes temporarily removably securing a lens member to an inner surface of the front housing, where the lens member has a width in an x-axis, a height in a y-axis and a thickness in a z-axis. Further, the method includes connecting the front housing to the rear housing such that the first inner surface and the second inner surface both exert a z-axis force on the lens member such that the lens member is substantially immovable along the z-axis.

Additional aspects and advantages of the described embodiments are set forth in part in the description which follows, and in part are obvious from the description, or may be learned by practice of the described embodiments. The aspects and advantages of the described embodiments may also be realized and attained by the means of the instrumentalities and combinations particularly pointed out in the appended claims.

BRIEF DESCRIPTION OF THE DRAWINGS

The various described embodiments will hereinafter be described in conjunction with the appended drawings provided to illustrate and not to limit the described embodiments, wherein like designations denote like elements, and in which:

FIG. 5 is a rear view of the device of FIG. 2;

FIG. 6 is a partial cross-sectional view along line 6—6 of FIG. 5 of a cross-section of the mobile electronic device, including a mechanism for fixedly securing the front and rear housings.

DETAILED DESCRIPTION

Figure 2:
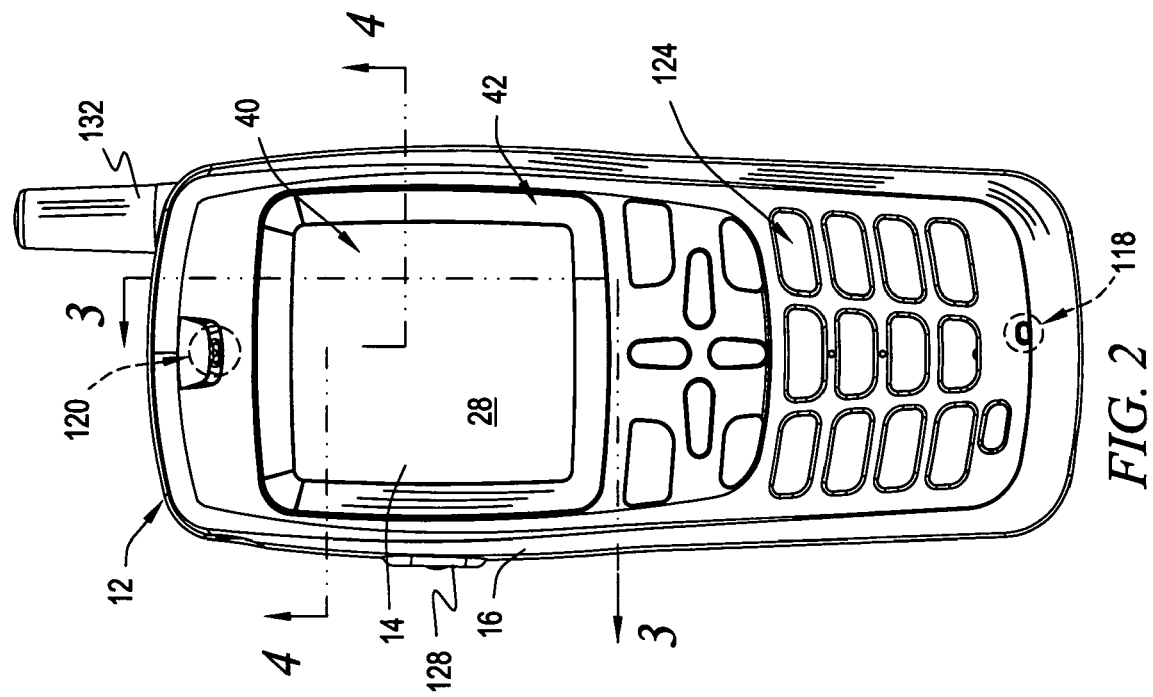
FIG. 2 is a front view of one embodiment of a mobile electronic device incorporating the lens of FIG. 1.

The described embodiments provide a mobile or portable electronic device, and associated methods of creating such a device, having a display unit with a securely positioned and tamper-evident protective lens. The lens is internally mounted and sandwiched, or held, between front and rear housings. The biasing forces provided by the housings results in a lens that is substantially immovable in a z-axis, and additionally in x- and y-axes in some embodiments. Further, the internal positioning results in a lens that cannot be removed without damaging the lens or one of the housings. Thus, the described embodiments include methods and devices for affixing to a mobile electronic device a lens that is tamper-resistant and/or tamper-evident, and which does not rely on external fixation to hold the lens on to the device.

Before select embodiments are explained in detail, it is to be understood that the described embodiments are not limited in application to the details of the construction and the arrangement of the components set forth in the following description or illustrated in the drawings. The described embodiments are capable of other forms and may be carried out in various ways. Also, it is understood that the phraseology and terminology used herein is for purpose of description and should not be regarded as limiting.

Figure 1:
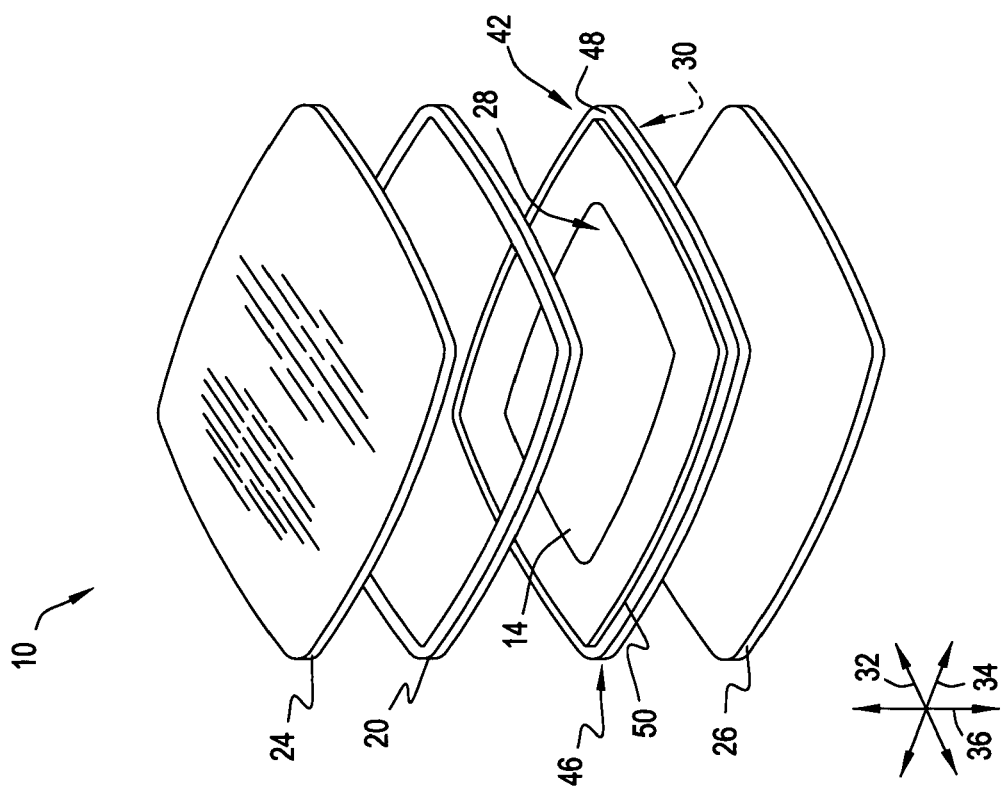
FIG. 1 is an exploded view of one embodiment of a lens assembly.
Figure 3:
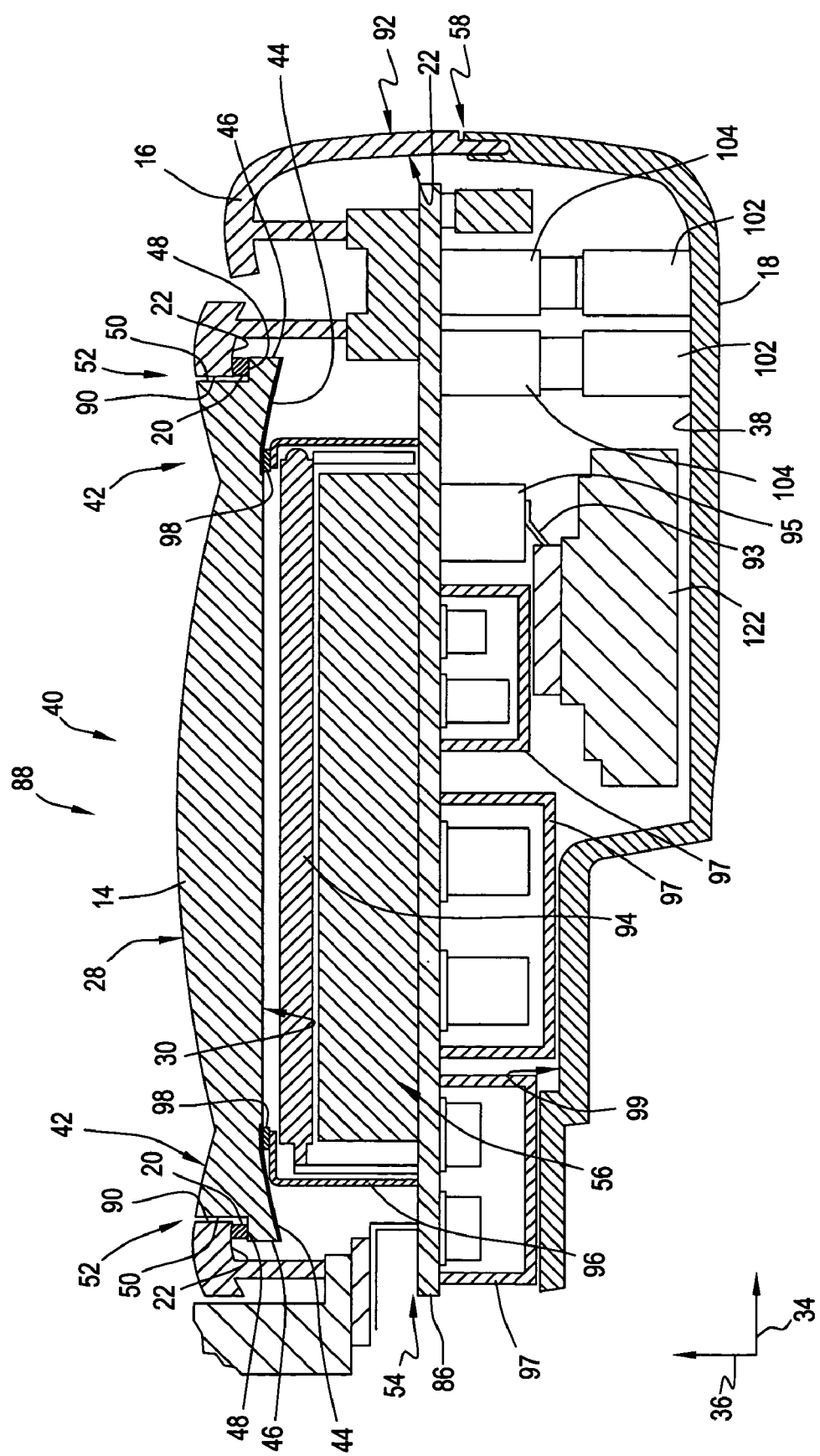
FIG. 3 is a partial cross-sectional view along line 3—3 in FIG. 2 of the mobile electronic device, including an electronics module having a display unit positioned adjacent the lens held within front and rear housings, and including a securing mechanism for fixedly attaching the front and rear housings.

Referring to FIGS. 1–3, a lens assembly 10 for use in a mobile electronic device 12 includes a lens member 14 positionable between a front housing 16 and a rear housing 18 (FIG. 3) of the electronic device. Lens assembly 10 may include a temporary retaining mechanism 20 for holding lens member 14 against an inner surface 22 (FIG. 3) of front housing 16 of device 12 during assembly. Further, lens assembly 10 may include an external temporary protective mechanism 24 and an internal temporary protective mechanism 26 to respectively cover a front surface 28 and a rear surface 30 of lens member 14 during assembly. One or both protective mechanisms 24, 26 may be removed prior to final assembly of device 12. Lens member 14 has a width in an x-axis 32 (FIG. 1), a height in a y-axis 34 and a thickness in a z-axis 36 such that upon insertion into device 12, front housing inner surface 22 and an inner surface 38 (FIG. 3) of rear housing 18 both exert a z-axis force on lens member 14 such that the lens member is substantially immovable along z-axis 36. In particular, either directly or through one or more interconnected or stacked internal components, front and rear housings 16, 18 provide bearing surfaces that prevent relative z-axis 36 movement of lens member 14 within device 12. Thus, since front and rear housings 16, 18 provide sandwiching bearing forces that hold lens member 14 against front housing inner surface 22 without any freedom of z-axis 36 movement, the lens member cannot be dislodged by a dropping force and it does not allow for tampering as the interface between the lens member and the front housing inner surface cannot be separated without damaging device 12.

Lens member 14 may include any substantially transparent material capable of providing a protective covering. For instance, lens member 14 may be formed from one or a combination of plastics, such as acrylic and polycarbonate, and glasses. In one embodiment, for example, lens member 14 may be molded from an acrylic such as V825 supplied by Rohm & Haas. Depending on the material, lens member 14 may or may not require a coating of another harder material to provide increased scratch resistance. Suitable examples of a hard coating include a urethane clear coat or an ultra-violet shielding clear coat. Front and rear surfaces 28, 30 may be substantially parallel to one another, or may define at least one relatively convex or concave surface in at least one axis to form an optical device that respectively increases or decreases the size of the image below lens member 14. For example, referring to FIG. 3, rear surface 30 is substantially flat while front surface 28 is convexly-shaped along y-axis 34 thereby defining a substantially convex lens. Additionally, lens member 14 may include a central portion 40 (FIGS. 2 and 3) for providing a viewing area and a perimeter portion 42 associated with retaining lens member 14 within front and rear housings 16, 18. At least part of perimeter portion 42 generally defines an area that receives the z-axis 36 forces that bias lens member 14 to remain in a fixed position relative to housings 16, 18. It should be noted, however, that central portion 40 may also receive some or all of these bearing forces. Further, lens member 14 may include masking or printing 44 (FIG. 3), such as reverse pad printing, on front or rear surfaces 28, 30 to provide a border to lens member 14 or to include branding or manufacturing information. Preferably masking or printing 44 is disposed on rear surface 30 at perimeter portion 42 so as to avoid damage from external elements and so as to not interfere with the majority of the viewing area.

Additionally, lens member 14 includes an edge surface 46 (FIG. 1) that connects front and rear surfaces 28, 30 and provides a bearing surface relative to front housing 16. Edge surface 46 may receive retaining forces in x- and/or y-axis 32, 34 directions from front housing inner surface 22 to substantially limit movement of lens member 14 in the x- and/or y-axis. In one embodiment, for example, perimeter portion 42 includes a secondary front surface 48 and a secondary edge surface 50 that interact with corresponding portions of front housing inner surface 22 to define a lens/housing interface 52 (FIG. 3). In this embodiment, lens/housing interface 52 forms a z-shaped boundary that provides limiting surfaces to prevent movement of lens member 14 in each of the x-, y- and z-axis 32, 34, 36 relative to at least one of front or rear housing 16 or 18.

Temporary retaining mechanism 20 includes any mechanism for temporarily removably fixing or securing lens member 14 to front housing 16. For example, temporary retaining mechanism 20 is useful during the assembly of device 12 to hold lens member 14 in a predetermined position relative to front housing 16, but still allows lens member 14 to be removed prior to final assembly of the housings 16, 18. Suitable examples of temporary retaining mechanism 20 include adhesives, contact cements, and mechanical devices such as snaps or screws. Further, temporary retaining mechanism 20 is positioned between at least select portions of lens member 14 and front housing 16. In one particular embodiment, for example, temporary retaining mechanism 20 is defined by an adhesive gasket around the entire perimeter portion 42 of lens member 14. Additionally, temporary retaining mechanism 20 may include a relatively thin layer of a compressible material, such as a foam, rubber, felt, paper or plastic having adhesive-carrying surfaces. The compressible material allows temporary retaining mechanism 20 to fill at least a portion of lens/housing interface 52 to compensate for differences in tolerance stack-ups during compression of lens member 14 after securing together front and rear housings 16, 18.

External and internal protective mechanisms 24, 26 may include any mechanism capable of providing a temporary protective covering over front and rear surfaces 28, 30, respectively, of lens member 14. Suitable embodiments of protective mechanisms 24, 26 include plastic films, paper, elastomers, etc. Protective mechanisms 24, 26 may be attached to lens member 14 via adhesives or via static forces. In one embodiment, for example, protective mechanisms 24, 26 include statically-adhered plastic films that cover at least central portion 40 of lens member 14 thereby allowing temporary retaining mechanism 20 to connect lens member 14 to front housing 16. Further, in this embodiment, by only covering central portion 40 of lens member 14 on front surface 28, external protective mechanism 24 may be removed later on in the assembly process, or sometime after final assembly, without disturbing the positioning of the lens member relative to front housing 16. Thus, protective mechanisms 24, 26 provide a layer or coating over lens member 14 to protect front and rear surfaces 28, 30 from becoming scratched, dinged or otherwise damaged.

Referring to FIGS. 2–4 and 7, mobile electronic device 12 may include any type of portable device having an electronics module 54 for sending output signals to a visual display unit 56 which creates a textual or graphical image viewable by a user. Lens member 14 is positioned adjacent to display unit 56 to protect the display unit from external damage or tampering. Suitable examples of mobile electronic device 12 include a communications device, a gaming device, a remote control device, a personal computer-type device, a global positioning system ("GPS") receiver or controller, etc. Suitable examples of a communications device for sending and/or receiving communications-related signals include a mobile phone such as a code division multiple access ("CDMA")-, wide-band code division multiple access ("WCDMA")-, global system for mobile communications ("GSM")-, advance mobile phone service ("AMPS")- and time division multiple access ("TDMA")-based system, a satellite phone, a portable phone, a pager, a wireless two way communications device, a personal digital assistant, a personal computer, devices communicating via Bluetooth technology, and other similar types of communications systems involving the receipt and/or transmission of short- or long-range communications signals. For example, one embodiment of mobile electronic device 12 includes the Qualcomm QSec 2700 mobile phone.

Figure 4:
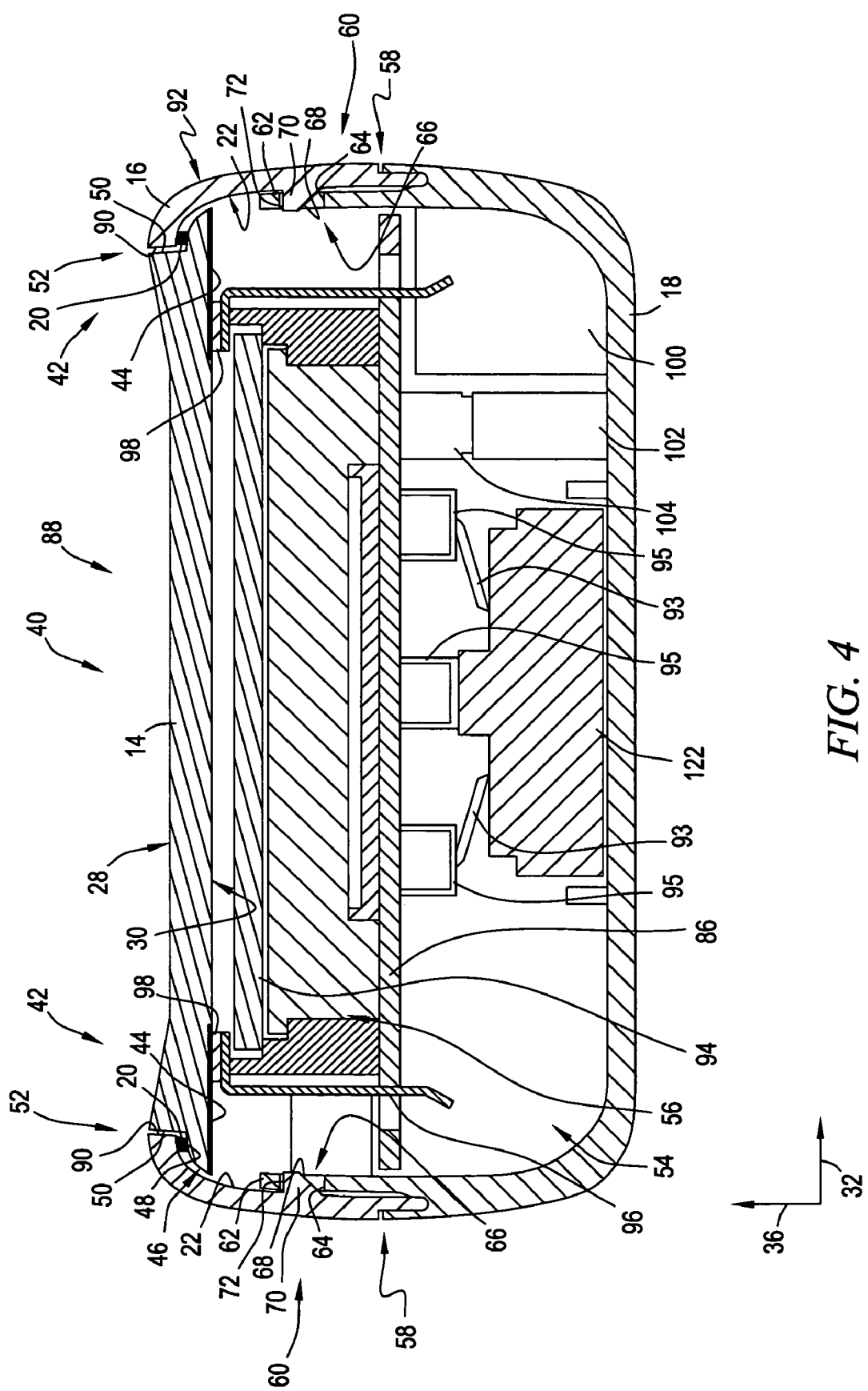
FIG. 4 is a partial cross-sectional view along line 4—4 in FIG. 2 of the mobile electronic device, including the electronics module with the display unit positioned adjacent the lens held within front and rear housings.
Figure 7:
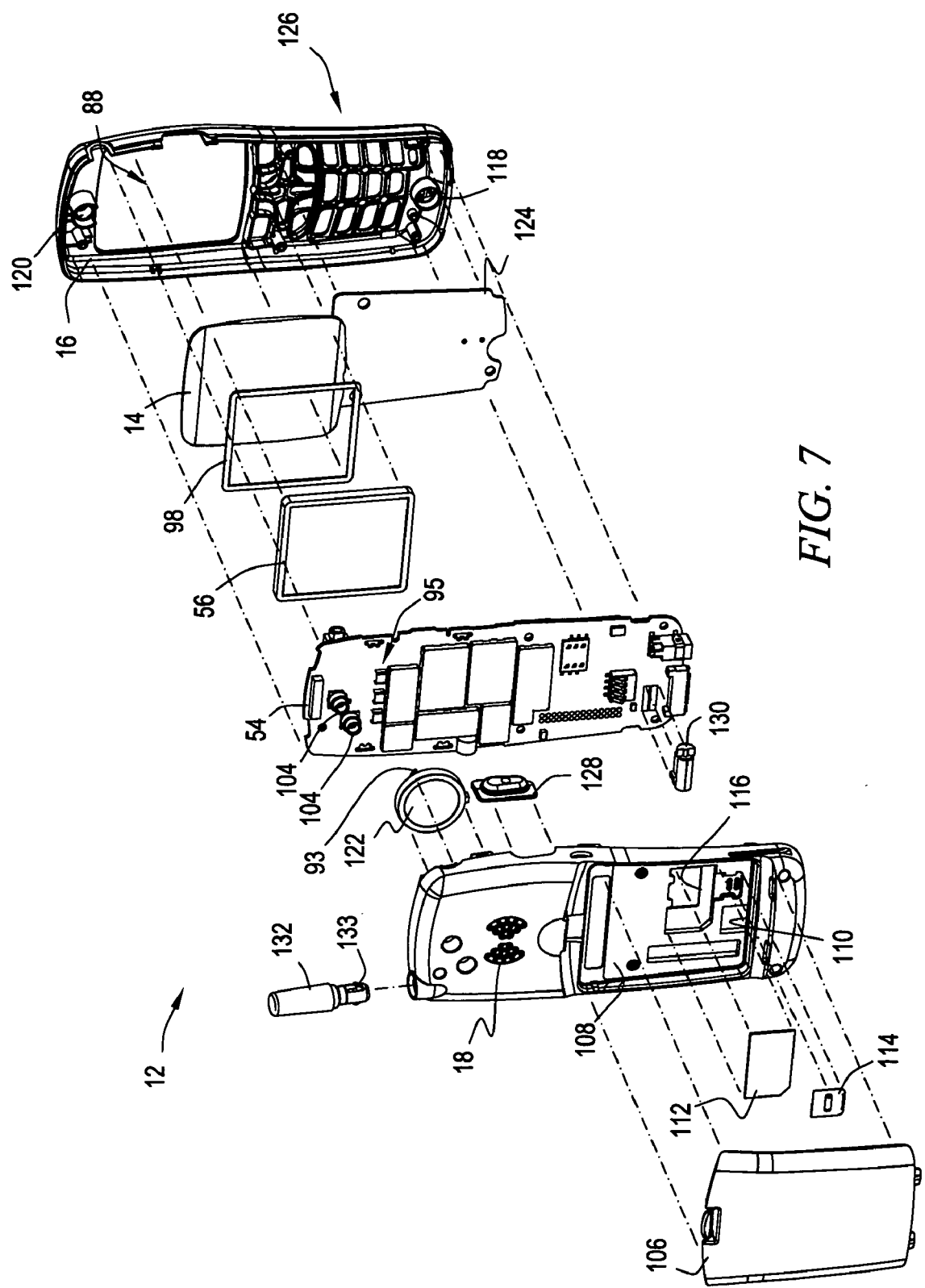
FIG. 7 is an exploded view of the components within the device of FIG. 2.

Referring to FIGS. 3 and 4, front housing 16 of mobile electronic device 12 mates with rear housing 18 along a housing interface 58 formed adjacent to the edges of the housings. Housings 16, 18 thereby form an enclosure for lens member 14, display unit 56 and electronics module 54 such as by meeting edge-to-edge or overlapping. Alternatively, an intermediate housing may interconnect front and rear housings 16, 18 in this manner. In one embodiment, for example, housing interface 58 defines a tongue and groove joint that substantially limits movement of all or a portion of front and rear housings 16, 18 in a direction parallel to a plane formed by x-axis 32 and y-axis 34. This tongue and groove joint thereby further provides an additional tamper-resistant feature to device 12.

Additionally, referring to FIGS. 4–6, front and rear housings 16, 18 may further include one or more securing mechanisms 60 to fix the housings relative to one another.

Suitable examples of securing mechanisms 60 include one or a combination of snaps, detents, screws, nails, adhesives, etc. In one embodiment, referring to FIG. 4, securing mechanism 60 is a snap-type mechanism defined by a flange 62 extending from rear housing 18 and having an internal wall 64 that defines an engaging opening 66. Flange 62 is flexibly connected to rear housing 18 such that as housings 16, 18 are moved together, the flange rides on and flexes over a ramp portion 68 of an engagement member 70 projecting from front housing inner surface 22. Front and rear housings 16, 18 are then connected once flange opening 66 encompasses engagement member 70 such that flange wall 64 engages a limiting wall 72 of the engagement member that prevents relative movement of the front and rear housings to hold them in a connected state. In another embodiment, referring to FIGS. 5 and 6, securing mechanism 60 includes a screw or nail 74 inserted through an opening 76 in a mounting structure 77 in one housing, rear housing 18 in this case, and into a mounting structure 78 in the opposing housing, front housing 16 in this case. Screw or nail 74 includes a head 80 that overlaps and hold the one housing and a shank 82 that engages the opposite housing. Shank 82, which may include threads for the screw embodiment, includes a diameter or outer shape greater than a diameter or inner shape of a receiving opening 84 in mounting structure 78 of the other housing such that the screw rotatably fits or the nail force fits within the mounting structure and holds the housings 16, 18 together. Further, a portion of electronics module 54, such as a printed circuit board ("PCB") 86, may be captured by screw or nail 74 between the corresponding mounting structures 77, 78 and thereby fixedly secured within housings 16, 18.

Additionally, referring to FIGS. 3 and 4, front and rear housings 16, 18 secure lens member 14 within device 12 by sandwiching the lens member and exerting z-axis 36 forces. In particular, lens member 14 is mounted adjacent to an opening 88 in front housing 16 defined by an internal wall 90 than connects the inner and outer surfaces 22, 92 of the front housing. In one embodiment, an intermediate component such as electronics module 54 is positioned between housings 16, 18 and transfers the z-axis biasing force from rear housing 18 to lens member 14 when housings 16, 18 are engaged. For example, electronics module 54 engages rear housing 18 and lens member 14 either directly or through mounted components. In one embodiment, display unit 56 is mounted on one side of PCB 86 and is positioned adjacent to front housing opening 88 and lens member 14 so that it engages the lens member. Display unit 56 includes a display mechanism 94 contained within a protective casing 96, such as a bezel formed from plastic or metal. Suitable examples of display mechanism 94 include a monochrome or color liquid crystal display ("LCD") with passive matrix or active matrix/thin film transistor technology, and light emitting diodes ("LEDs"). Display unit 56 may also include a compressible gasket 98 mounted on casing 96 at one or more portions of the interface with lens member 14. Gasket 98 may be compressible and insures transfer of a biasing force between display unit 56 and lens member 14. Suitable examples of materials formed into gasket 98 include rubber, elastomers, foams, felt, etc. Further, referring particularly to FIG. 3, PCB 86 may also include one or more shields 97 mounted to the surface opposite from display unit 56, where the shields may directly engage a mounting surface 99 formed on inner surface 38 of rear housing 18. Shields 97 may be formed from a metal, ceramic or composite and form a cavity that encompasses various mounted components on PCB 86. Shields 97 act as an insulator to prevent or reduce the entry or exit of electromagnetic waves from the cavity, thereby preventing or reducing electromagnetic wave interference between mounted components on PCB 86 and with external electronic devices. Referring particularly to FIG. 4, rear housing 18 may include additional support structures, such as walls 100 and 102, that either directly engage PCB 86 or directly engage components 104, such as an RF test port in a mobile phone embodiment, mounted to PCB 86. PCB 86 may also include other embedded circuitry and other mounted electronic components that vary depending on the given application of device 12.

Mobile electronic device 12 may additionally include various other components depending on the exact function of the device. For example, referring to FIG. 7, for a mobile phone embodiment, device 12 may further include a power module 106 for energizing electronics module 54 and display unit 56. For instance, power module 106, such as a battery pack, may be removably positionable in a recessed portion 108 of rear housing 18 such that its electrical connectors mate through an opening 110 with a corresponding electrical connector on electronics module 54. Further, a communications card 112, such as a removable user identity module ("RUIM"), may be removably positionable, such as with a retaining clip 114, within recessed portion 108 such that its electrical connectors mate through an opening 116 with a corresponding electrical connector on electronics module 54. Additionally, the mobile phone embodiment of device 12 may include input and/or output devices 118, 120 and 122, such as a microphone and a near- and far-field audio speaker, respectively, that are additionally secured within housings 16, 18 and connected to electronics module 54. For instance, far-field audio speaker 122 may have leads 93 connected to electronics module 54 via electromechanical standoffs 95, which may also support speaker 122 above electronics module 54 to create additional space for mounting additional circuit elements. Further, an input mechanism 124, such as an alpha-numeric and functional keypad as well as a navigation mechanism and corresponding keys and circuitry, may be located within housings 16, 18 and extend through predetermined openings 126 in front housing 16 for access by a user. Further, in an embodiment of a phone, a push-to-talk button 128 may extend from housings 16, 18 and connect to corresponding switches on electronics module 54. Similarly, a vibrator motor 130 for silently signaling a user may be positioned within one of housings 16, 18 and connected to electronics module 54. Additionally, an antenna assembly 132 may be secured to either housing 16 or 18 and connected with electronics module 54 to enable transmission and receipt of communications signals. For instance, in one embodiment, antenna assembly 132 may include an engagement mechanism 133, such as detents, that fix antenna assembly 132 to one of housings 16, 18 in a substantially irreversible manner such that attempted removal of antenna assembly 132 results in damage to at least one of the antenna assembly and the housings to provide evidence of tampering.

In operation, mobile electronic device 12 may be formed by connecting together a front housing assembly with a rear housing assembly to capture lens assembly between the housings. For example, in one embodiment relating to a mobile phone, front housing 16 is positioned with outer surface 92 facing down. Then, the internal components associated with the front housing portion of device 12 are installed onto inner surface 22 of front housing 16. For example, lens assembly 10 is installed into front housing 16 adjacent to opening 88 such that predetermined portions of the lens assembly, such as perimeter portion 42, engage front housing inner surface 22. Alternatively, lens assembly 10 may include temporary retaining mechanism 20 that removably secures lens member 14 to front housing inner surface 22. In another alternative embodiment, lens member 14 is installed such that edge surface 46 abuts corresponding wall structures associated with opening 88 or inner surface 22 which substantially limit any x- and y-axis motion of the lens member. Input mechanisms 124 such as the alphanumeric keypad and navigational keys may also be installed such that the keys extend through predetermined openings 126 and such that contact surfaces are facing up. Additional components, such as microphone 118 and near-field speaker 120, may also be installed onto inner surface 22 of front housing 16 with contact surfaces facing up. Further, prior to installing electronics module 54, push-to-talk button 128 is loaded into front housing 16 and, if utilized, the internal protective mechanism 26 covering rear surface 30 of lens member 14 is removed. Then, electronics module 54 with attached display unit 56 is placed into front housing 16 against inner surface 22 and/or lens member 14. In particular, display unit 54 is positioned facing down adjacent to opening 88 in front housing 16 such that at least portions of the display unit, such as casing 96 or gasket 98, contact lens member 14. Additionally, contacts or contact surfaces on electronics module 54 are positioned over corresponding contacts associated with the previously installed electronic components. Then, the internal components associated with the rear housing portion of device 12 are installed onto inner surface 38 of rear housing 18, which is positioned with inner surface 38 facing up. For example, far-field speaker 122, vibrator motor 130 and antenna assembly 132 may be mounted onto inner surface 38 with their contact mechanisms facing up. Then, front and rear housing assemblies are aligned so that corresponding contacts are properly positioned and the housings are connected together such that inner surfaces 22 and 38 exert opposing biasing forces that substantially limit z-axis movement of lens member 14. In particular, internal snap-type securing mechanisms are aligned to fixedly secure together housings 16, 18 and bias mounting surfaces and/or intermediate components against lens member 14. Further, additional securing mechanisms, such as nails or screws, may be installed through both housings 16, 18 after they are placed together. The securing mechanisms fixedly secure the housings together in a substantially irreversible manner such that any subsequent attempt to separate the housings results in noticeable damage to the housings. Further, the sandwiching of the lens assembly between the housings also substantially irreversibly affixes the lens in the mobile electronic device in a similar manner. The lens assembly and the securing mechanisms, individually and in combination, thereby provide a tamper-resistant mobile electronic device. Therefore, mobile electronic device 12 provides a substantially immovable, internally mounted lens member 14 that will not loosen or fall off and that is tamper-evident due to its secure positioning.

Further, additional details of the structure and assembly of the antenna mechanism may be found in co-pending application Ser. No. 10/964,403, entitled "Devices And Methods For Retaining An Antenna," filed concurrently herewith and incorporated by reference above. Similarly, additional details of the structure and assembly of the electro-mechanical standoff may be found in co-pending application Ser. No. 10/964,105, entitled "Devices And Methods For Creating An Electrical Connection," filed concurrently herewith and incorporated by reference above. And, additional details of the structure and assembly of the housing interface and securing mechanisms for connecting the housings may be found in co-pending application Ser. No. 10/964,405 entitled "Devices And Methods For Connecting Housings," filed concurrently herewith and incorporated by reference above.

The previous description of the various embodiments is provided to enable any person skilled in the art to make or use the described embodiments. The various modifications to these embodiments will be readily apparent to those skilled in the art, and the generic principles defined herein may be applied to other embodiments without the use of the inventive faculty. Thus, the embodiments are not intended to be limited to the embodiments described herein, but are to be accorded the widest scope consistent with the principles and novel features disclosed herein.

Other features and advantages of the described embodiments are set forth in the following claims.

What is claimed is:

1. A mobile electronic device, comprising:
a front housing having a first inner surface;
a rear housing having a second inner surface;
a lens member having a width in an x-axis, a height in a y-axis and a thickness in a z-axis, the lens member positionable between the front housing and the rear housing such that the first inner surface and the second inner surface both exert a z-axis force on the lens member such tat the lens member is substantially immovable along the z-axis; and
a display module positionable between the lens member and the rear housing, the display module having a display area positionable adjacent to the lens member.

2. The device of claim 1, wherein the front housing further comprises a first outer surface and at least one wall defining an opening between the first inner surface and the first outer surface, and wherein at least a portion of the lens member is positionable within the opening such that the at least one wall exerts at least an x-direction force on the lens member such that the lens member is substantially immovable along the x-axis.

3. The device of claim 1, wherein the front housing Thither comprises a first outer surface and at least one wall defining an opening between the first inner surface and the first outer surface, and wherein at least a portion of the lens member is positionable within the opening such that the at least one wall exerts at least a y-direction force on the lens member such that the lens member is substantially immovable along the y-axis.

4. The device of claim 3, wherein at least a portion of the lens member is positionable within the opening such that the at least one wall exerts at least an x-direction force on the lens member such that the lens member is substantially immovable along the x-axis.

5. The device of claim 1, further comprising a communications module positionable between the display module and the rear housing.

6. The device of claim 1, wherein the lens member further comprises a first front surface and a first rear surface, wherein at least a portion of the first front surface is fixedly positionable relative to first inner surface and wherein at least a portion of the first rear surface is fixedly positionable relative to at least a portion of the second inner surface.

7. The device of claim 6, further comprising an intermediate component having a second front surface and a second rear surface, wherein at least a portion of the second front surface is fixedly positionable against the first inner surface, and wherein at least a portion of the second rear surface is fixedly positionable against the first front surface.

8. The device of claim 7, wherein the intermediate component comprises at least one of a sealing mechanism and a spacing mechanism.

9. The device of claim 6, further comprising a first intermediate component having a second front surface and a second rear surface, wherein at least a portion of the second front surface is fixedly positionable relative to the first rear surface, and wherein at least a portion of the second rear surface is fixedly positionable relative to the second inner surface.

10. The device of claim 9, wherein the first intermediate component comprises at least one of a display module and a communications module.

11. The device of claim 9, further comprising a second intermediate component having a third front surface and a third rear surface, wherein at least a portion of the third front surface is fixedly positionable relative to the first inner surface, and wherein at least a portion of the third rear surface is fixedly positionable relative to the first front surface.

12. The device of claim 11, wherein the first intermediate component comprises at least one of a display module and a communications module, and wherein the second intermediate component comprises at least one of the other one of the display module and the communications module, a sealing mechanism and a spacing mechanism.

13. The device of claim 6, wherein the first front surface comprises a central portion projecting above a perimeter portion, and wherein only the perimeter portion is positionable against the first inner surface.

14. The device of claim 1, wherein the front housing further comprises a first securing mechanism and the rear housing further comprises a second securing mechanism, and wherein the first securing mechanism and the second securing mechanism have an engagement position such tat the front housing is fixedly secured to the rear housing.

15. The device of claim 14, wherein at least one of the first securing mechanism and the second securing mechanism are selected from the group consisting of snaps, detents, screws, nails and adhesives.

16. A tamper-evident communications device, comprising:
   a front housing having a first inner surface and a first outer surface and at least one wall defining an opening between the first inner surface and the first outer surface;
   a rear housing having a second inner surface;
   an securing mechanism connectable to both the front housing and the rear housing, wherein the securing mechanism fixedly positions the front housing relative to the rear housing;
   a lens member having a width in an x-axis, a height in a y-axis and a thickness in a z-axis, the lens member fixedly positioned in the z-axis between the front housing, adjacent to the opening, and the rear housing such that the first inner surface and the second inner surface both exert a z-axis force on the lens member; and
   a display module positionable between the rear housing and the lens member, the display module having a display area facing the lens member.

17. The device of claim 16, further comprising at least one intermediate component forming a continuous supporting interface between at least one of the lens member and the front housing and the lens member and the rear housing.

18. The device of claim 17, further comprising a communications module positionable between the front housing and the rear housing and connectable with the display module.

19. The device of claim 16, wherein at least one of the first securing mechanism and the second securing mechanism are selected from the group consisting of snaps, detents, screws, nails and adhesives.

20. A communications device, comprising:
   a front housing having a first inner surface;
   a first support structure associated with the first inner surface;
   a rear housing having a second inner surface;
   a second support structure associated with the second inner surface; and
   a lens member mountable between the front housing and the rear housing against both the first support structure and the second support structure such that the lens member is substantially immovable in a direction between the front housing and the rear housing;
   wherein the second support structure comprises a display module positionable between the lens member and the rear housing, the display module having a display area positionable adjacent to the member.

21. A lens associated with a display of a mobile electronic device having a front housing and a rear housing, the lens comprising:
   a body having a width in an x-axis, a height in a y-axis and a thickness in a z-axis, the body further having a front surface and a rear surface, the body configured to be positionable adjacent a display area of a display module and between a first inner surface of the front housing and a second inner surface of the rear housing such that the first inner surface and the second inner surface both exert a z-axis farce on the body such that the body is fixedly positioned in the z-axis relative to the front housing and the rear housing.

22. The lens of claim 21, wherein the body further comprises at least one wall between die front surface and the rear surface, wherein the at least one wall is positionable such that the front housing exerts at least one of an x-axis force and a y-axis force on the wall such that the body is substantially immovable along at least one of the x-axis and y-axis.

23. A method of assembling a mobile electronic device, comprising:
   providing a front housing having a first inner surface;
   providing a rear housing having a second inner surface;
   positioning a lens member in between the front housing and the rear housing, the lens member having a width in an x-axis, a height in a y-axis and a thickness in a z-axis;
   positioning a display module between the lens member and the rear housing, the display module having a display area positionable adjacent to the lens member; and
   connecting the front housing to the rear housing such that the first inner surface and the second inner surface both exert a z-axis force on the lens member such that the lens member is substantially immovable along the z-axis.

24. The method of claim 23, where connecting the front housing to the rear housing further comprises fixedly securing the front housing to the rear housing in a manner to resist separation of the housings without damaging the housings.

25. A method of assembling a communications device, comprising:

providing a front housing having a first inner surface;
providing a rear housing having a second inner surface;
removably securing a lens member to an inner surface of the front housing, the lens member having a width in an x-axis, a height in a y-axis and a thickness in a z-axis;
positioning a display module between the front housing and the rear housing, the display module having a display area positionable adjacent to the lens member; and
connecting the front housing to the rear housing such that the first inner surface and the second inner surface both exert a z-axis force on the lens member such that the lens member is fixedly positioned in the z-axis relative to the front housing and the rear housing.

26. The method of claim 25, where connecting the front housing to the rear housing further comprises substantially irreversibly securing the front housing to the rear housing.

27. The device of claim 20, wherein the second support structure further comprises a communications module, wherein the display module is mountable to the communications module.

28. The device of claim 27, wherein the front housing further comprises a first outer surface and at least one wall defining an opening between the first inner surface and the first outer surface, and wherein at least a portion of the lens member is positionable within the opening such that the at least one wall exerts at least an x-direction force and a y-direction force on the lens member such that the lens member is substantially immovable along the x-axis and the y-axis.

29. A mobile electronic device, comprising:
a front housing having a first inner surface;
a rear housing having a second inner surface;
a lens member having a width in an x-axis, a height in a y-axis and a thickness in a z-axis, the lens member positionable between the front housing and the rear housing such that the first inner surface and the second inner surface both exert a z-axis force on the lens member such that the lens member is substantially immovable along the z-axis, wherein the lens member further comprises a first front surface and a first rear surface, wherein at least a portion of the first front surface is fixedly positionable relative to first inner surface and wherein at least a portion of the first rear surface is fixedly positionable relative to at least a portion of the second inner surface; and
a first intermediate component having a second front surface and a second rear surface, wherein at least a portion of the second front surface is fixedly positionable relative to the first rear surface, and wherein at least a portion of the second rear surface is fixedly positionable relative to the second inner surface, wherein the first intermediate component comprises at least one of a display module and a communications module.

30. The device of claim 29, wherein the first intermediate component comprises a display module, and wherein the display module is positionable between the lens member and the rear housing, the display module having a display area positionable adjacent to the lens member.

31. The device of claim 29, wherein the front housing further comprises a first outer surface and at least one wall defining an opening between the first inner surface and the first outer surface, and wherein at least a portion of the lens member is positionable within the opening such that the at least one wall exerts at least an x-direction force and a y-direction force on the lens member such that the lens member is substantially immovable along the x-axis and the y-axis.

32. A mobile electronic device, comprising:
a front housing having a first inner surface;
a rear housing having a second inner surface;
a lens member having a width in an x-axis, a height in a y-axis and a thickness in a z-axis, the lens member positionable between the front housing and the rear housing such that the first inner surface and the second inner surface both exert a z-axis force on the lens member such that the lens member is substantially immovable along the z-axis, wherein the lens member further comprises a first front surface and a first rear surface, wherein at least a portion of the first front surface is fixedly positionable relative to first inner surface and wherein at least a portion of the first rear surface is fixedly positionable relative to at least a portion of the second inner surface; and
a first intermediate component having a second front surface and a second rear surface, wherein at least a portion of the second front surface is fixedly positionable relative to the first rear surface, and wherein at least a portion of the second rear surface is fixedly positionable relative to the second inner surface, wherein the first intermediate component comprises at least one of a display module and a communications module; and
a second intermediate component having a third front surface and a third rear surface, wherein at least a portion of the third front surface is fixedly positionable against the first inner surface, and wherein at least a portion of the third rear surface is fixedly positionable against the first front surface, wherein the second intermediate component comprises at least one of the other one of the display module and the communications module, a sealing mechanism and a spacing mechanism.

33. The device of claim 32, wherein the first intermediate component comprises a display module, and wherein the display module is positionable between the lens member and the rear housing, the display module having a display area positionable adjacent to the lens member.

34. The device of claim 32, wherein the front housing further comprises a first outer surface and at least one wall defining an opening between the first inner surface and the first outer surface, and wherein at least a portion of the lens member is positionable within the opening such that the at least one wall exerts at least an x-direction force and a y-direction force on the lens member such that the lens member is substantially immovable along the x-axis and the y-axis.

* * * * *

UNITED STATES PATENT AND TRADEMARK OFFICE
CERTIFICATE OF CORRECTION

PATENT NO. : 7,133,222 B2
APPLICATION NO. : 10/963962
DATED : October 12, 2004
INVENTOR(S) : Thomas J. Chintala and Scott R. Semenik It is certified that error appears in the above-identified patent and that said Letters Patent is hereby corrected as shown below:

On The Title Page Item (73)
Assignee: please replace "QUALCOMM, Inc." with -- QUALCOMM Incorporated--

Claim 3 line 2, please replace: "Thither comprises a first outer..." with -- further comprises a first outer--

Claim 14 line 5, please replace: "..securing mechanism have an engagement position such tat" with -- an engagement position such that--

Claim 31, line 5, please replace: "...member is positionable within the opening such that the at least..." with --member is positionable within the opening such that at least--

Signed and Sealed this

Twenty-fifth Day of September, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,133,222 B2 | Page 1 of 1 |
| APPLICATION NO. | : 10/963962 | |
| DATED | : November 7, 2006 | |
| INVENTOR(S) | : Thomas J. Chintala and Scott R. Semenik | |

It is certified that error appears in the above-identified patent and that said Letters Patent is hereby corrected as shown below:

On The Title Page Item (73)
Assignee: please replace "QUALCOMM, Inc." with -- QUALCOMM Incorporated--

Claim 3 line 2, please replace: "Thither comprises a first outer..." with -- further comprises a first outer--

Claim 14 line 5, please replace: "..securing mechanism have an engagement position such tat" with -- an engagement position such that--

Claim 31, line 5, please replace: "...member is positionable within the opening such that the at least..." with --member is positionable within the opening such that at least--

This certificate supersedes Certificate of Correction issued September 25, 2007.

Signed and Sealed this

Thirtieth Day of October, 2007

JON W. DUDAS
*Director of the United States Patent and Trademark Office*